United States Patent [19]
Parker

[11] 3,864,976
[45] Feb. 11, 1975

[54] REUSABLE BOTTLE THERMOMETER
[75] Inventor: Robert Parker, Danville, Calif.
[73] Assignee: Robert Parker Research, Inc., Livermore, Calif.
[22] Filed: Oct. 31, 1973
[21] Appl. No.: 411,592

[52] U.S. Cl. ............... 73/356, 73/343 B, 116/114.5
[51] Int. Cl. ........................................... G01k 11/12
[58] Field of Search ......... 73/356, 343 B; 116/114.5

[56] References Cited
UNITED STATES PATENTS
3,440,882  4/1969  Jones .................................. 73/356
3,661,142  5/1972  Flam .................................. 73/356

*Primary Examiner*—James J. Gill
*Assistant Examiner*—Anthony V. Ciarlante

[57] ABSTRACT

A laminated digital thermometer is provided for determining the temperature of a fluid in a container. A digital thermometer strip is employed having a thin dimensionally stable plastic film upon which is printed a dark mask, leaving alpha-numeric symbols transparent. Coated onto the transparent areas are liquid crystal compositions having transition temperatures appropriately related to the alpha-numeric designation. The liquid crystal layer is then coated with a dark backing.

The digital thermometer strip is introduced between two films of water impermeable plastic which extend beyond the periphery of the strip and which are sealed together to provide a water impermeable barrier. In a preferred embodiment, an efficient heat exchanging strip is secured to the liquid crystal surface under the protective film. Means for securing the composite laminate in good heat exchanging relationship with a surface is secured to the composite.

9 Claims, 8 Drawing Figures

PATENTED FEB 11 1975 3,864,976
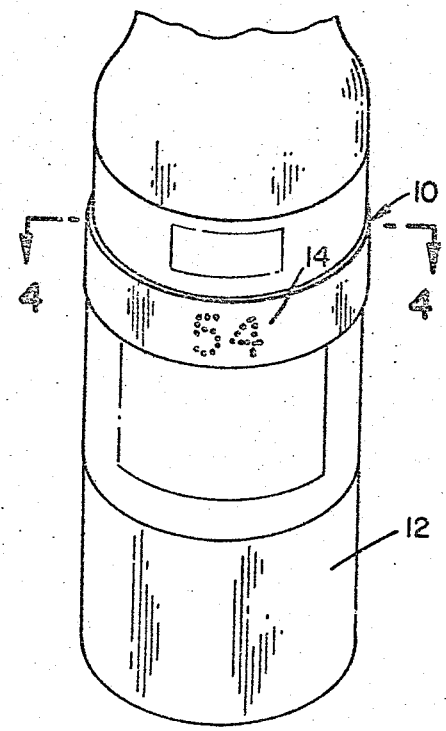
FIG_1
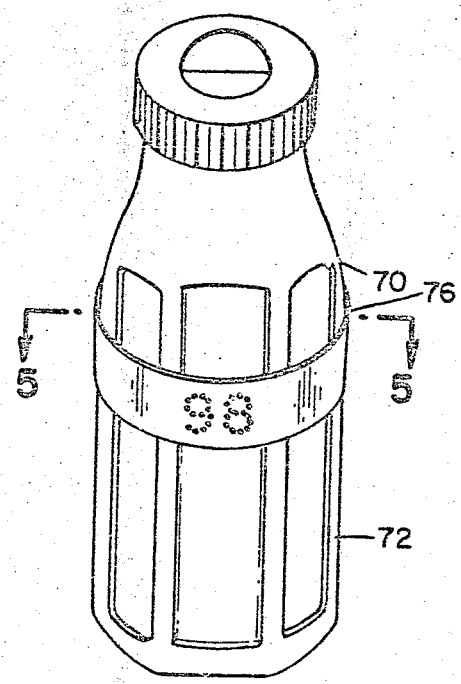
FIG_2
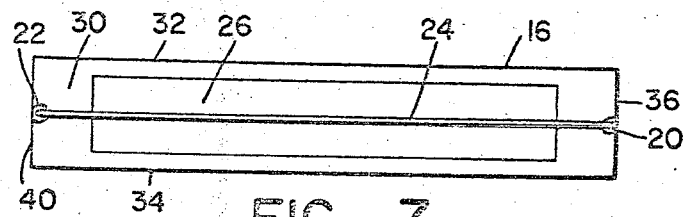
FIG_7
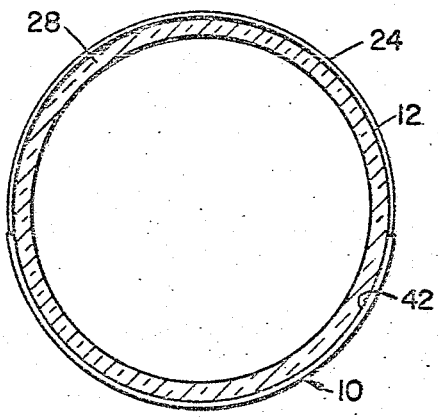
FIG_4
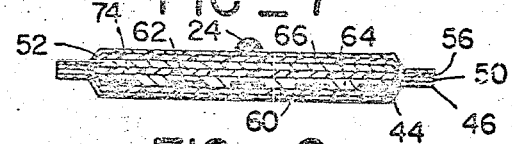
FIG_8
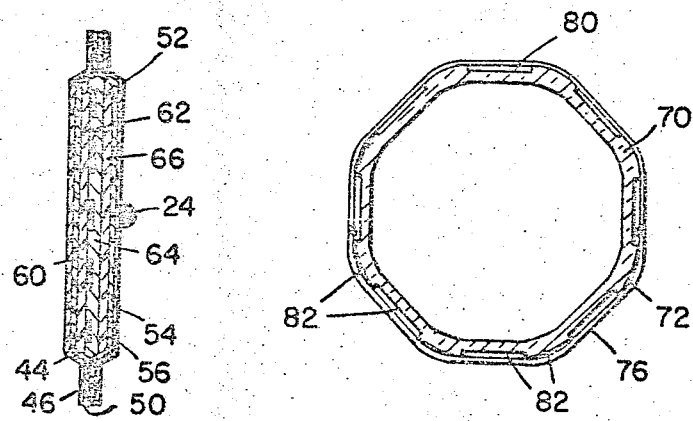
FIG_3   FIG_5
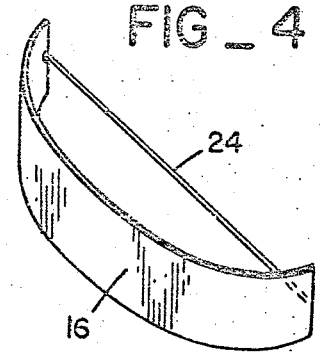
FIG_6

REUSABLE BOTTLE THERMOMETER

BACKGROUND OF THE INVENTION

1. Field of the Invention

In many situations, it is desirable to be able to determine in a convenient and safe manner the temperature of a fluid in a container. The temperature of a fluid can be related to gustatory effects, such as with wine or beer, where a particular temperature is related to the gustatory enjoyment. In other situations, the temperature can be related to safety situations. For example, where a baby's formula is concerned, a more accurate and efficient method than the time-honored skin test is desirable. Also, in aquaria, it is normally desirable to maintain a constant temperature to insure the health of the fish.

Thermometers which are normally employed in aquaria have many deficiencies. First, they are difficult to read, usually having small numerals, which are only difficulty discernible. Secondly, unless the aquarium is kept exceptionally clean and the water clear, further interference with visual reading of the thermometer occurs. Therefore, the use of thermometers in the water have suffered from many disadvantages. There has, therefore, been a continuing need to provide a convenient and accurate means for indicating the temperature of the water in an aquarium.

BRIEF DESCRIPTION OF THE DRAWINGS

FIGS. 1 and 2 are front elevational views of two different containers having thermometers about their periphery in accordance with this invention.

FIG. 3 is a cross section of a thermometer in accordance with this invention.

FIG. 4 and 5 are cross sections along FIGS. 1 and 2 respectively.

FIG. 6 is a perspective view of a thermometer in accordance with this invention.

FIG. 7 is a rear elevational view of a thermometer in accordance with this invention.

FIG. 8 is an alternate embodiment of a thermometer in accordance with this invention.

DESCRIPTION OF THE SPECIFIC EMBODIMENTS

The subject invention provides a readily visible means under a wide variety of conditions for determining with substantial accuracy the temperature of a fluid in a container. Depending upon the nature of the surface, various means are provided for insuring good heat exchange between the thermometric heat indicator and the walls of the container in contact with the fluid. The subject invention provides means to obtain the temperatures of fluids in containers having round walls, flat walls, uneven walls as well as polygonal walls.

In FIG. 1, a wine bottle is indicated having a digital thermometer 10 held snugly to the wine bottle surface 12. The digital thermometer indicates the temperature by the digits "54" 14.

The particular embodiment employed with the wine bottle is depicted in FIGS. 2, 4, 6 and 7. A laminate sheet 16 being elongate in the horizontal direction is connected at each of its ends by clips 20 and 22 to an elastomeric band 24. The thermometer 10 can then be conveniently placed over a wine bottle or other bottle and held snugly against the wine bottle wall 28, so that the temperature of the fluid, e.g., wine in the bottle, is readily determined by the heat exchange across the wall 28 between the thermometer 10 and the fluid in the wine bottle.

The digital thermometer has a temperatue strip 26 which does not extend the full length of the thermometer. A water impermeable envelope 30 is of greater cross-sectional dimensions than said temperature strip 26 and has horizontal edges 32 and 34 and vertical edges 36 and 40 which extend a substantial distance, normally at least one-eighth inch, from the periphery of the temperature strip. The edges are sealed so as to insure a water impermeable barrier.

The clips 20 and 22 may be fastened to the plastic envelope by any convenient means. Conveniently, snap-on clips may be employed with the female members being permanently affixed to the opposite ends of the envelope 30 and the complementary male members being affixed to the opposite ends of the elastic band 24.

In FIG. 4, the thermometer 10 is indicated in its expanded form about the wine bottle surface 12 with the elastic band 24 holding the thermometer 10 with the inner surface 42 tightly held against the glass bottle surface 12. The digital thermometer 10 in this embodiment has a plurality of liquid crystal compositions extending the length of the temperature strip 26. Therefore, it is essential, that all of the temperature strips be in close contact with the wine bottle 12 so that good heat exchange is achieved between the liquid crystal compositions and the wine bottle surface.

The thermometer 10 is constructed to allow for good heat exchange between the surface of the container whose temperature is to be measured and relatively poor heat exchange with the ambient temperatures. Therefore, relataively accurate results can be obtained, irrespective of a substantial difference in temperature between the temperature of the container and the ambient temperature.

The construction of the thermometer is depicted in the cross-sectional view in FIG. 3. The shape is somewhat exaggerated to indicate the multitude of layers which are involved. A film is provided which is flexible, transparent, heat laminatable and water impermeable. Such a film is available as a laminate of polyethylene terephthalate as the outer layer and atactic polyethylene as the inner layer. The outer film 44 is therefore a composite of a Mylar film 46 (polyethylene terephthalate) and a polyethylene film 50.

The outer film 44 will generally be greater than about 4 mils in thickness, usually not exceeding about 10 mils in thickness, more usually being from about 4 to 8 mils in thickness. The significant factor is that the outer film fulfills a number of functions. First, the outer film provides structural stability to the digital thermometer, while still allowing for substantial flexibility, so that the digital thermometer will conform to the container shape. Secondly, the outer film provides a water impermeable barrier. Thirdly, the outer film substantially reduces the heat exchange between the temperature strip 26 and the ambient environment. The Mylar film which provides the water impermeable barrier will generally be from about 1 to 3 mils in thickness.

The inner film 52 is also a composite of a Mylar film 54 and a polyethylene film 56. This film will generally be at least 0.5 mil in thickness and usually not exceed 3 mils, more usually being about 2 mils in thickness. The particular thickness of the film is important in allowing for good heat exchange between the temperature strip 26 and the container surface, while still providing the water impermeable barrier. Therefore, it is essential that the inner film be thin enough to allow for rapid heat conduction between the temperature strip 26 and the surface to which the thermometer 10 is applied, while still affording the necessary protection.

The construction of the temperature strip 26 also allows for further insulation of the liquid crystal compositions from the ambient environment. A description of the manufacture of the strip may be found in copending U.S. application, Ser. No. 351,220, filed Apr. 13, 1973, which is a continuation-in-part of application Ser. No. 263,064, filed June 15, 1972 now abandoned, whose relevant disclosures are incorporated herein by reference.

The temperature strip 26 has a Mylar film 60 onto which is printed a mask 62, indicated as a broken line. The Mylar film 60 is generally of about 2 to 5 mils thickness. The mask is a dark mask, usually a black paint, which leaves transparent areas in the shape of alpha-numeric symbols, for the purpose of this invention, normally numerals in a vertical linear array.

Coated onto the mask 62 and film 60 are a plurality of microencapsulated liquid crystal compositions 64 which fill the transparent areas and extend beyond the transparent areas to provide a relatively uniform coating of the strip, so that the strip will satisfactorily bend about curves or corners. The edges of the liquid crystal compositions are contiguous and there is some mixing at the edges. The thickness of the liquid crystal layer will generally be of from about 3 to 5 mils. The liquid crystal compositions have transition temperature ranges, so that there is a significant overlap between successive transition temperature ranges.

Over the liquid crystal compositions is now painted a black film 66, which is conveniently derive from a black paint. Any dark backing may be employed which is sufficiently thin so as not to impede the heat exchange between the liquid crystal compositions and the surface whose temperature is being measured.

The elastic band 24 urges the thermometer 14 into good thermal contact, where one has a bottle and one wishes to use the thermometer repeatedly. Where the thermometer is to be permanently affixed to a flat surface, an adhesive heat exchanging coating may be applied to the inside film 52 and a protective backing placed over the adhesive coating. In this manner, the thermometer may be affixed to a flat surface such as the glass wall of an aquarium, in good heat exchanging relationship with the glass wall. If desirable, to enhance the heat exchange properties, fine metallic particles may be admixed with the adhesive.

In order to insure accurate response of the thermometer 10 to the surface against which it is applied, it is necessary that the entire thermometer strip 26 be in good heat exchange relationship with the surface. Each of the liquid crystal compositions must accurately respond to the temperature of the surface, if the entire numeral is to be clearly visible, when the surface temperature is within the particular transition temperature range of one of the liquid crystal compositions. Where there may be discontinuities in the adherence of the temperature strip 26, a preferred embodiment is to include a thin metal sheet between the dark backing 66 and the inner envelope wall 52.

For example, where the surface of the container is not a smooth surface, such as an uneven surface or a polygonal container such as a baby bottle 70, the digital thermometer 10 may not provide the continuous contact between the liquid crystal compositions and the container surface 72. In order to insure that all the liquid crystal compositions of the temperature strip 26 are at the temperature of the container surface 72, the thermometer 10 is modified by introducing a thin metal sheet 74 against the black pigment coating 66. This embodiment is depicted in FIG. 8.

The metal sheet may be of the same dimension as the temperature strip 26 or of somewhat greater dimension, but smaller than the envelope 30. The metal film may be of any convenient metal, such as iron, both magnetic or nonmagnetic, aluminum, copper or nickel, particularly aluminum, and will generally be of from about 0.5 to 2 mils in thickness. The metal strip serves to diffuse the heat uniformly across the backing of the temperature strip 26. In this manner, intermittent contact of the thermometer 10 with the surface is permissible without concern that some of the liquid crystal composition is not in good heat exchange relationship with the container. With a magnetic iron strip, there is the further advantage that the thermometer strip can be readily secured to iron objects, such as pipes, reactors, and the like.

In FIG. 5, the digital thermometer 76 with the elastic band 80 is depicted with gaps 82 between the thermometer and the bottle surface 72. The presence of the metal strip obviates any concern about the intermittent contact of the thermometer with the surface.

In preparing the digital thermometers of this invention, the inner film 52 and the outer film 44 are drawn from continuous films. As the two films pass through two rollers, at least one of which is hot, the temperature strip 26 is fed intermittently between the two films and between the two rollers. The temperature must be below about 210°F and the contact time should be long enough that a strong bond is obtained between the inner and outer films, but short enough to ensure that there be no deleterious effect on the liquid crystal compositions. Optionally, a metal film strip may be placed on the backing of the temperature strip when it is introduced between the two films. Sufficient space is permitted between the temperature strips, so as to insure a satisfactory distance between the edge of the envelope 30 and the periphery of the strip 26.

The subject invention provides a novel and convenient means for rapidly determining the temperature of a wide variety of fluids in containers. It is found that the temperature of the container wall does provide an accurate indication of the temperature of the fluid in the container. That is, there is good heat exchange across the container wall. Therefore, the thermometer provides a relatively accurate indication of the temperature of the liquid contents.

The subject thermometers can be prepared with large numerals so as to be readily visual and easily discernible. The thermometers can be used in a wide variety of environments, and with a wide variety of containers, such as wine bottles, baby bottles, aquaria, and the like. The thermometers provide an accurate reading of the container contents and are not significantly affected by variations in the ambient temperatures. The thermometers are sturdy, long lasting, and allow for enhanced gustatory appreciation of wine, an easy method to determine the temperature of a baby's formula in an accurate and efficient manner, and metering of aquaria temperatures in a simple and efficient manner, as well as other applications. Further, the plastic envelope can be used to enclose sheets or be attached to sheets containing information related to the use of the thermometer, art work, and the like, to further enhance the utility or attractiveness of the thermometer.

Although the foregoing invention has been described in some detail by way of illustration and example for purposes of clarity of understanding, it will be obvious that certain changes and modifications may be practiced within the scope of the appended claims.

What is claimed is:

1. As an article of manufacture, a digital thermometer comprising a laminate sandwich having:

a digital thermometer strip of a transparent base film, a dark mask painted on said base strip leaving transparent areas of alpha-numeric symbols, a plurality of liquid crystal compositions coated over said mask forming a substantially uniform layer, wherein each alpha-numeric designation is covered with a liquid crystal composition having a transition range associated with the alpha-numeric symbol, and a black film backing on said liquid crystal composition layer;

an inner film and an outer film of greater cross-sectional dimension than said thermometer strip, wherein each of said films are water impermeable and said outer film is substantially thicker than said inner film, with said inner and outer films heat bonded together to form an envelope containing said digital thermometer strip, whose edges extend substantially beyond the periphery of said thermometer strip; and means affixed to said envelope for securing the inner film in good heat exchanging relationship to a surface.

2. An article of manufacture according to claim 1, wherein said means for securing is an elastic band attached to opposite ends of said envelope.

3. An article of manufacture according to claim 2, wherein intermediate said thermometer strip and inner film is a thin metallic film.

4. An article of manufacture according to claim 3, wherein said metallic film is aluminum, iron or copper.

5. An article of manufacture according to claim 1, wherein said securing means is an adhesive adhered to said inner film.

6. As an article of manufacture, a digital thermometer comprising a laminate sandwich having:

a digital thermometer strip of a rectangular transparent base film, a dark mask painted on said base strip leaving transparent areas of numerical symbols in a linear array along the long dimension of said film, a plurality of liquid crystal compositions coated over said mask forming a substantially uniform layer, wherein each numerical designation is covered with a liquid crystal composition having a transition range associated with said numerical symbol, and a black film backing on said liquid crystal composition layer;

an inner film of from about 0.5 to 3 mils in thickness having an inner heat sealable layer and an outer water impermeable layer and an outer film of from about 4 to 10 mils in thickness having an inner heat sealable layer and an outer water impermeable layer, wherein said inner and outer films are heat sealed together to form a water impermeable envelope about said digital thermometer strip; and resilient means affixed to opposite ends of said envelope for securing the digital thermometer to a container.

7. An article of manufacture according to claim 6, wherein intermediate said thermometer strip and inner film is a thin film of aluminum, iron or copper.

8. An article of manufacture according to claim 6, wherein said resilient means is an elastic band.

9. An article of manufacture according to claim 5, wherein said inner layers are atactic polyethylene and said outer layers are polyethylene terephthalate.

* * * * *